US006585371B1

(12) United States Patent
Lin

(10) Patent No.: US 6,585,371 B1
(45) Date of Patent: Jul. 1, 2003

(54) EYEGLASS FRAME HAVING TENSION ADJUSTABLE TEMPLE COUPLING

(75) Inventor: Kuo-Tseng Lin, Taipei (TW)

(73) Assignee: Gazelle Corporation, Taipei (TW)

( * ) Notice: Subject to any disclaimer, the term of this patent is extended or adjusted under 35 U.S.C. 154(b) by 0 days.

(21) Appl. No.: 10/170,461

(22) Filed: Jun. 14, 2002

(51) Int. Cl.[7] .................................................. G02C 5/22
(52) U.S. Cl. .......................... 351/113; 351/153; 16/228
(58) Field of Search ................................ 351/113, 114, 351/111, 119, 153, 140, 41; 16/228

(56) References Cited

U.S. PATENT DOCUMENTS 5,400,090 A * 3/1995 Chen .......................... 351/113

* cited by examiner

*Primary Examiner*—Hung Xuan Dang
(74) *Attorney, Agent, or Firm*—Rosenberg, Klein & Lee

(57) ABSTRACT

The structure of changeable spring of industrial glasses comprises a plastic glasses frame; a hinge means comprising a first hinge member and a second hinge member, the first hinge member fixed on one the of the glasses frame and pivotally connected with one side of the second hinge member by a screw, the other side of the second hinge member being form a hole of the screw thread; a spring; a rivet pin connected to the hole of the second hinge member and fixed by screw thread; two glasses temples formed a tunnel in the top, located the spring and the rivet pin, and the side of the glasses temple top located a pit; and a assembly element which the part of it put into the tunnel of the glasses temple and located a recess, the dimension the same as the rivet pin, connected with the spring and the rivet pin and the portion of it as a cap filled with the pit of the glasses temple.

6 Claims, 5 Drawing Sheets

70
72
50
30
20
74
60
40
22
10

EYEGLASS FRAME HAVING TENSION ADJUSTABLE TEMPLE COUPLING

FIELD OF THE INVENTION

The present invention relates, in general, to a industrial glasses, and in particular, to changeable spring for the structure of the industrial glasses.

BACKGROUND OF THE INVENTION

The glasses is made use of safety for industry , so far it can emphasize its comfort for user. Taiwan Pat. 288,615, modify of the industrial glasses structure, referring to FIG. 1 is shown a pictorial drawing for the glasses structure of the prior art. According to the FIG. 1, two-sided of the glasses frame is located a U-shape rabbet and two-sided of the tabular member is located a baffle, which is extended form the tabular member toward the other side and interior of it is located a flute. And also, the top of two glasses temples is positioned a gap, which the opening gap is located a column and the top of it is located a ladder which the side of the ladder is opposed to the flute of the baffle located a fixed member, embedded in the flute. And, the columns of the glasses temples are grafted on the U-shape rabbet.

An glasses, used for reading, is comfortable and design to match human engineering such as Taiwan Pat. 236,422, structure of the glasses, and referring to FIG. 2 is shown a explosive view of the glasses. The glasses comprises a connecting rod 10', a resilient member 20', a spring 30' and a rivet pin 40'. The one side of connecting rod 10' is located a hole, inside located a screw thread, used for fastening the rivet pin 40' which is in order through the spring 30' and the resilient member 20'.

SUMMARY OF THE INVENTION

It is an object of the present invention to provide an improved connecting structure for connecting a glasses temple with a glasses frame and provide a changeable structure industrial glasses in which the spring of the changeable structure could be changed after used for a long-term Another object of this invention is to provide a structure for convenience to assemble and the parts of connecting glasses decreased made cost down increase the competition of the industry.

Still another object of this invention is to provide a industrial glasses for convenience to swear by user.

Yet another object of this invention is to provide a connecting structure of the glasses to adjust the compression of the spring avoid changing in time.

The structure of the industrial glasses differs from the reading glasses either manufacture. The present invention is in combination with the connecting structure of the industrial glasses in order to user for convenience on work. The glasses temple of the present invention could accord the width of the user head to expand, which the connecting glasses is located spring character. The advantage of the present invention could change the spring when used so long that loose the spring. And, the structure of the connecting glasses could be adjusted, compressed the spring, when the spring is loose the flexibility.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refers to like parts, and in which:

DETAIL DESCRIPTION OF THE PREFERRED EMBODIMENT

Figure 1:
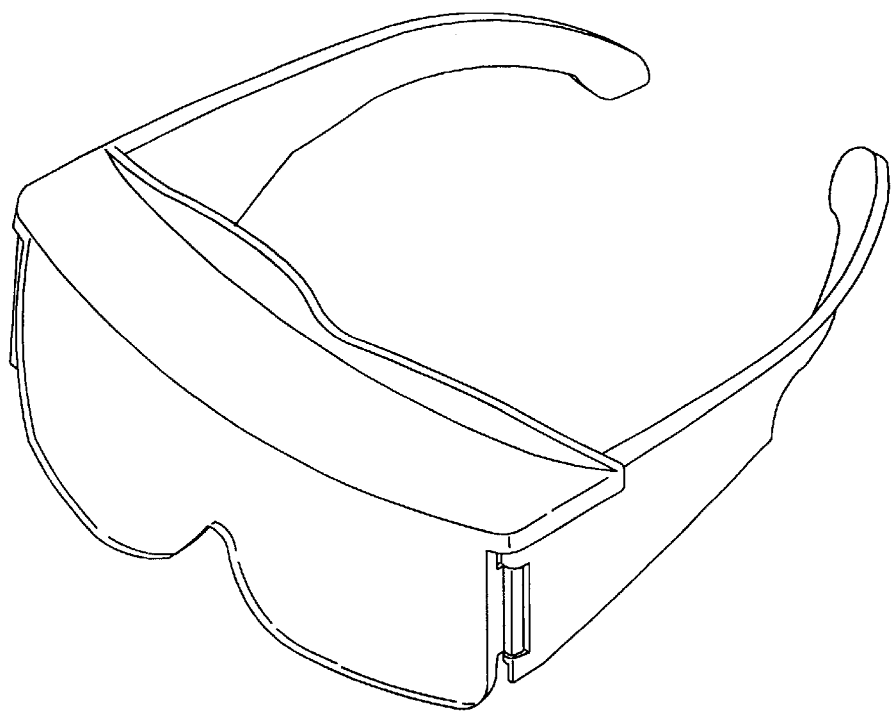
FIG. 1 is an illustrative depiction for the glasses structure of the prior art.
Figure 2:
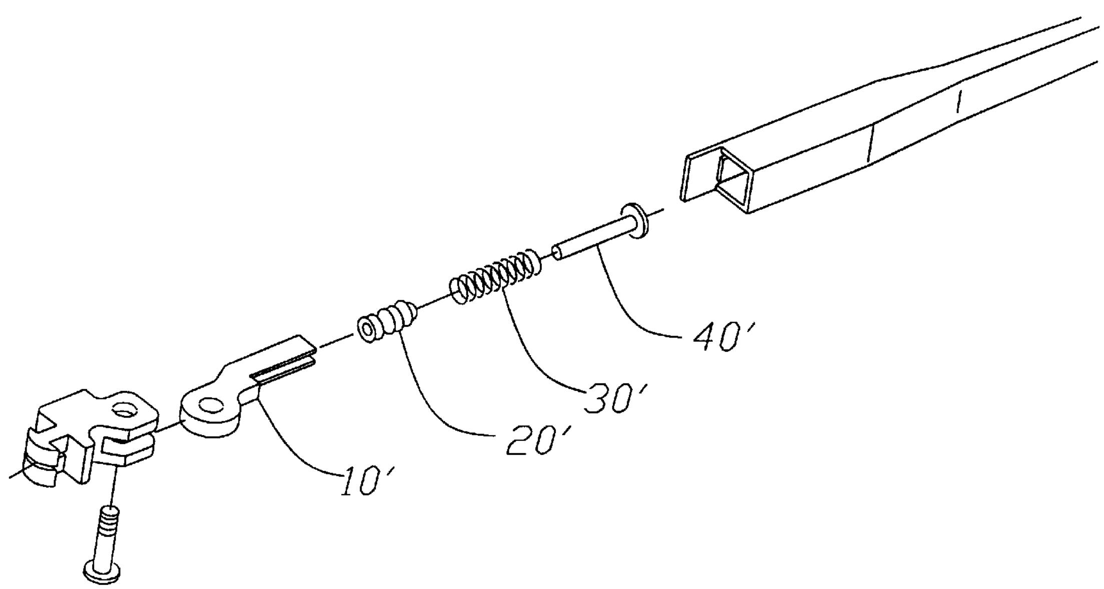
FIG. 2 is shown a explosive view of the glasses.
Figure 3:
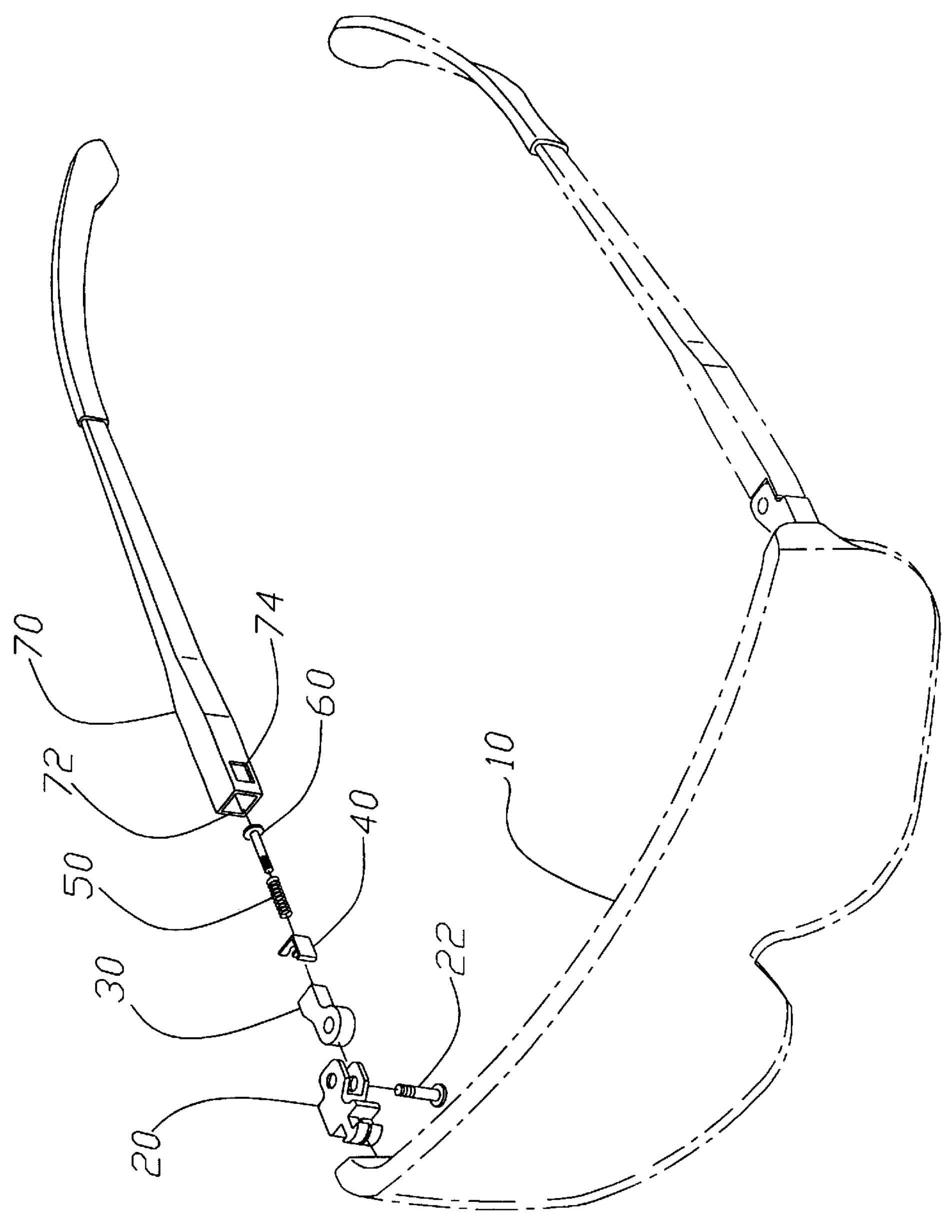
FIG. 3 is shown a schematic drawing of the present invention.
Figure 4B:
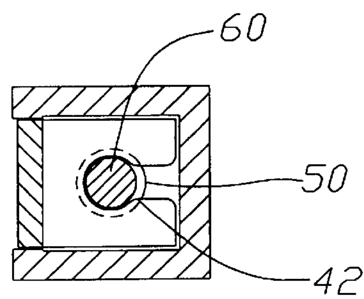
FIGS. 4A and 4B and 4C are shown partial enlarged view according to FIG. 3 of the assembly element of the present invention.
Figure 4A:
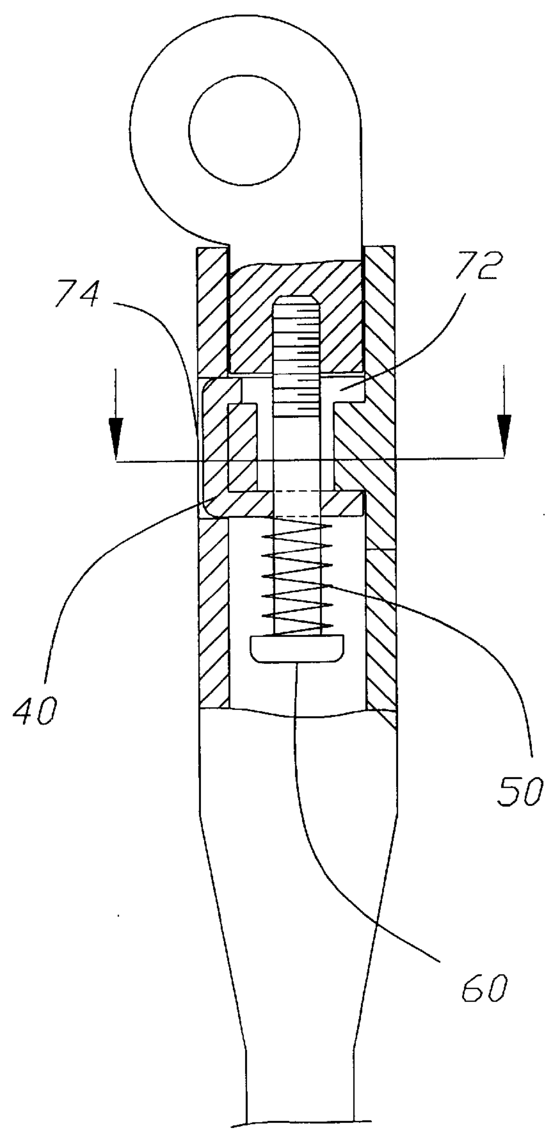
Figure 4C:
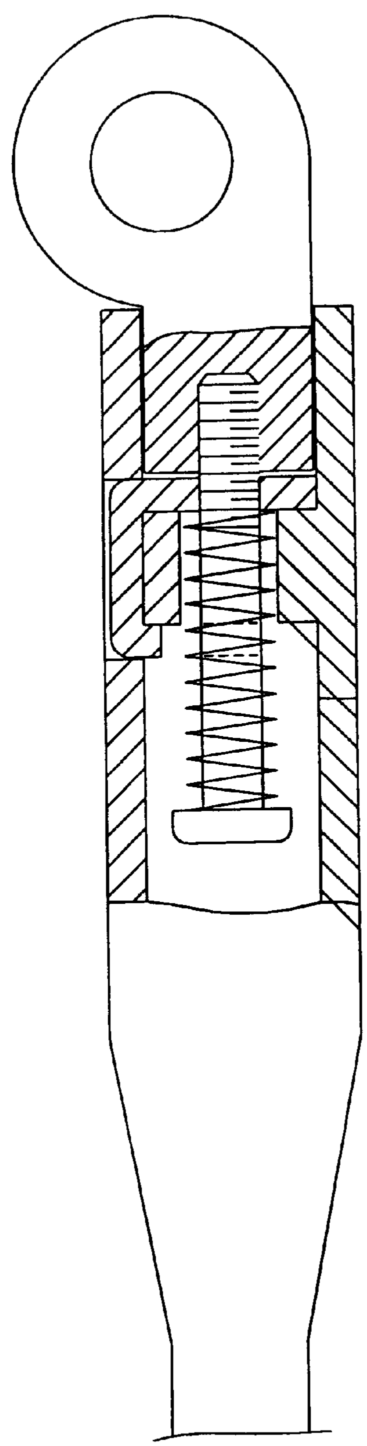

Referring to FIG. 3 is shown a schematic drawing of the present invention. The glasses structure comprises a plastic glasses frame 10, a hinge means including a first hinge member 20 and a second hinge member 30, the first hinge member 20 fixed on one side of the glasses frame 10 and pivotally connected with one side of the second hinge member 30 by a screw 22, the other side of the second hinge member 30 being form a hole of the screw thread, a spring 50, a rivet pin 60 connected to the hole of said second hinge member 30 and fixed by screw thread, wherein the nut dimension of the rivet pin 60 is shorter than the spring 50 and the screw thread of the rivet pin 60 used for adjusting the compression of the spring 50, two glasses temples 70 formed a tunnel 72 in the top, located the spring 50 and the rivet pin 60, and the side of the glasses temple 70 top located a pit 74, a assembly element 40 connected with the spring 50 and the rivet pin 60, wherein the pit 74 of the glass temple 70 is located a pinhole to easy lift the assembly element 40. Referring to FIGS. 4A and 4B and 4C are shown partial enlarged view according to FIG. 3 of the assembly element. The assembly element 40 which the part of it put into the tunnel 72 of the glasses temple 70 and located a recess 42, the dimension the same as the rivet pin 60, connected with the spring 50 and the rivet pin 60 and the portion of it as a cap filled with the pit of the glasses temple 70.

The assembly element 40 could be inverted to adjust the compression of the spring.

This invention has been disclosed in terms of certain embodiments. It will be apparent that many modifications can be made to the disclosed apparatus without departing form the invention. Therefore, it is the intent of the appended claims to cover all such variations and modifications as come within the true spirit and scope of the invention.

What claimed is claimed:

1. An eyeglass frame comprising:

(a) a lens frame member;

(b) a plurality of temple members, each said temple having a front end portion defining a tunnel cavity extending longitudinally therein, said front end portion having formed therein a pit opening communicating with said tunnel cavity; and, (c) a coupling assembly coupled to each of said temple members for hingedly coupling said temple member to said lens frame member in tension adjustable manner, said coupling assembly including:

at least one hinge member disposed in pivotally displaceable manner relative to said lens frame member, said hinge member engaging said tunnel cavity of one said temple member;

an assembly element coupled to said hinge and temple members for locking the engagement thereof, said assembly element extending transversely into said tunnel cavity through said pit opening of said temple member, said assembly element being disposed selectively in at least first and second alternative positions; and, a spring element disposed within said tunnel cavity of said temple member, said spring element engaging said assembly element for resiliently biasing the coupling of said hinge and temple members, said spring element generating different degrees of bias responsive to said assembly element being in said first and said second positions.

2. The eyeglass frame as recited in claim 1 wherein said hinge member includes a pin portion extending longitudinally therefrom, said spring element being captured in biased manner against said assembly element by said pin portion.

3. The eyeglass frame as recited in claim 2 wherein said pin portion is coupled in adjustably displaceable manner to a body portion of said hinge member, said pin portion being displaceable relative to said body portion for adjusting the bias of said spring element.

4. The eyeglass frame as recited in claim 3 wherein said pin portion is threadedly coupled to said body portion of said hinge member.

5. The eyeglass frame as recited in claim 1 wherein said assembly element is accessible for manipulation through said pit opening.

6. The eyeglass frame as recited in claim 1 wherein said first position of said assembly element is inversely related to said second position thereof.

* * * * *